H. & J. E. BUCKLEY.
WOOD VAT OR TANK.
APPLICATION FILED DEC. 20, 1918.

1,301,903.

Patented Apr. 29, 1919.
5 SHEETS—SHEET 3.

Inventors:-
Henry Buckley
Joseph Edward Buckley
By their Attorney:- Walter Gunn

H. & J. E. BUCKLEY.
WOOD VAT OR TANK.
APPLICATION FILED DEC. 20, 1918.

1,301,903.

Patented Apr. 29, 1919.
5 SHEETS—SHEET 4.

Inventors:—
Henry Buckley
Joseph Edward Buckley.
By their Attorney:— Walter Gunn.

H. & J. E. BUCKLEY.
WOOD VAT OR TANK.
APPLICATION FILED DEC. 20, 1918.
1,301,903.
Patented Apr. 29, 1919.
5 SHEETS—SHEET 5.
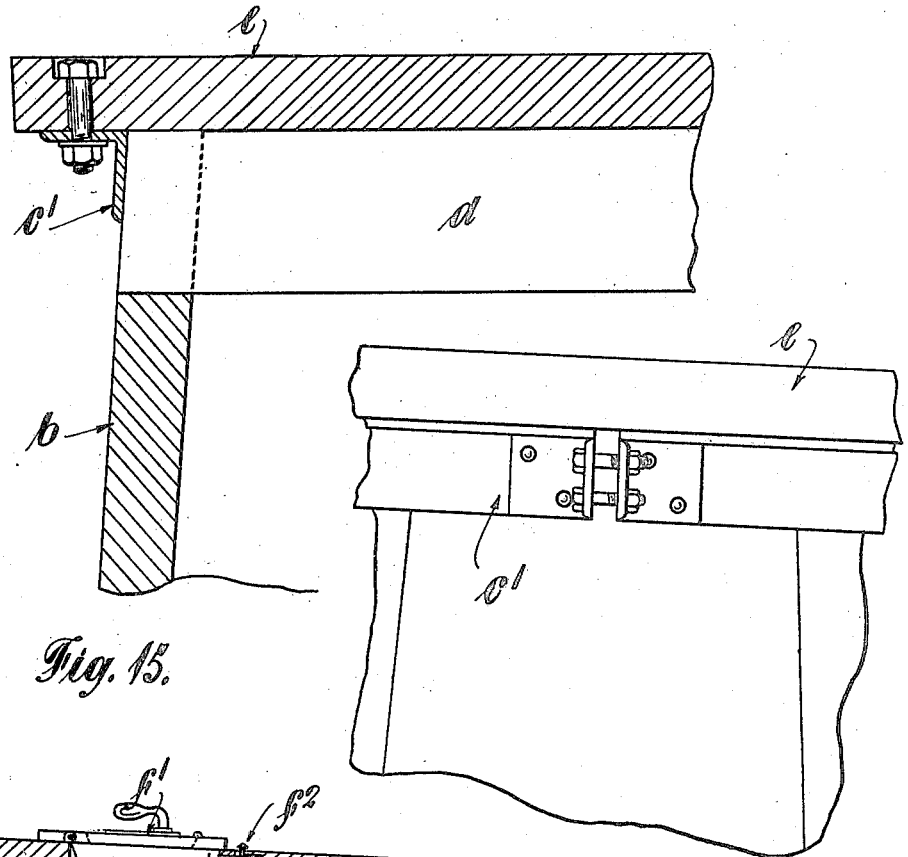
Fig. 15.
Fig. 16.
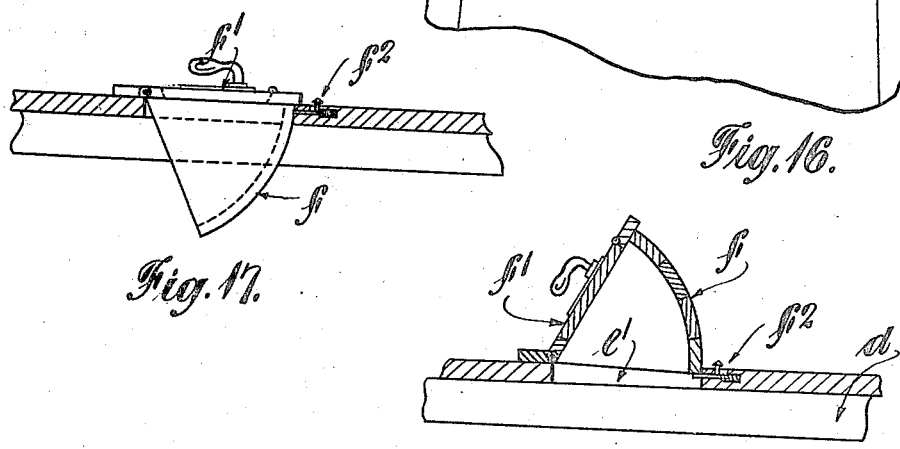
Fig. 17.
Fig. 18.
Inventors:-
Henry Buckley,
Joseph Edward Buckley
By their Attorney:- Walter Swinn

UNITED STATES PATENT OFFICE.

HENRY BUCKLEY AND JOSEPH EDWARD BUCKLEY, OF MANCHESTER, ENGLAND.

WOOD VAT OR TANK.

1,301,903.  Specification of Letters Patent. Patented Apr. 29, 1919.

Application filed December 20, 1918. Serial No. 267,711.

*To all whom it may concern:*

Be it known that we, HENRY BUCKLEY and JOSEPH EDWARD BUCKLEY, both subjects of the King of Great Britain and Ireland, and residents of Manchester, England, have invented certain new and useful Improvements in or Relating to Wood Vats or Tanks, of which the following is a specification.

Large wood vats ("rounds" or "squares") and tanks as used for storing alcoholic liquors, vinegar, chemical and other liquors are usually made with a head part which rests in a rabbet on the top edge of the vat or tank body. Owing to its large diameter and to its being comparatively thin in section, said head part is liable to sag or sink in the center unless reinforced transversely. Heretofore, the reinforcement has been effected by parallel beams laid across the top face of the head part and held thereto by a number of bolts and nuts. This arrangement however is objectionable in several ways, first, the beams rest upon and add to the weight of the head part and any sagging of the beams is imparted to the head part; secondly, the beams form an obstruction against which an attendant may stumble in walking upon the head part of the vat, and possibly precipitate him down the usual man-hole in the head part or off the vat, thirdly, the heads of the bolts, by which the head part is secured to the beams, lie inside the vat and are liable to corrode and thus cease to effectively support the head part, besides also causing contamination of the liquor.

The present invention has for its main object so to support or reinforce the center of the head part of a vat or tank that sagging is entirely prevented or reduced to a minimum, while the second part is rendered stronger and better adapted to carry weight, or to be made to large diameters. A further object is to provide a wood vat or tank, the upper surface of which is free of all obstructions and is rendered safer for an attendant when walking along the top of the vat or tank. Another object is to dispense with all metal connecting parts within the vat or tank, or to arrange them where they are not exposed to the action of the liquor, and cannot contaminate the liquor.

According to the invention, the wood beams are arranged below the head part and inside the vat or tank, instead of above the head part and outside the tank, the ends of the beams being supported in openings in the top edge of the vat or tank. The top faces of the beams are arched or cambered and the head part is made convex to suit, further the ends of the beams are tapered (or tapered and cottered) so that any tendency to deflection of the central parts of the beams is resisted by the sides of the vat or tank. The head part rests loosely upon the beams, and its outer edge lies in a rabbet in the top edge of the vat or tank, or such outer edge overlies the edge of the vat or tank and is secured to an angle-iron hoop fitted to the exterior of the vat or tank.

According to a further feature of the invention, a quadrant cover fixed or hinged is applied to the man-hole which on one side is fitted with a self-closing lid. By means of such cover and lid and in conjunction with the absence of beams on the top of the head part complete safety is afforded to the attendant in walking along the top of the vat, while said cover also serves to prevent sweepings or other deleterious matter entering the vat or tank.

The invention will be further described with the aid of the accompanying drawings, wherein.

Figure 7:
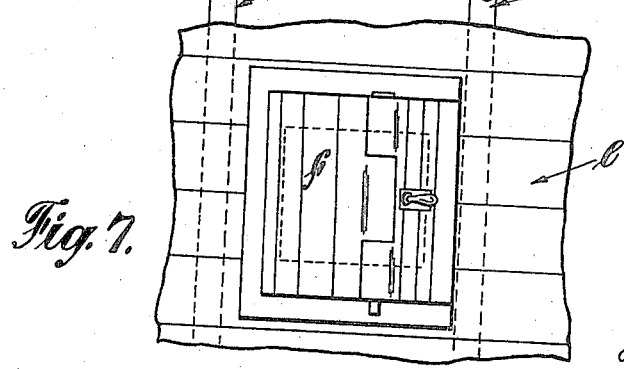

Fig. 7 a plan of the central portion of the head part and a cover used therewith for the man-hole.

Figure 8:
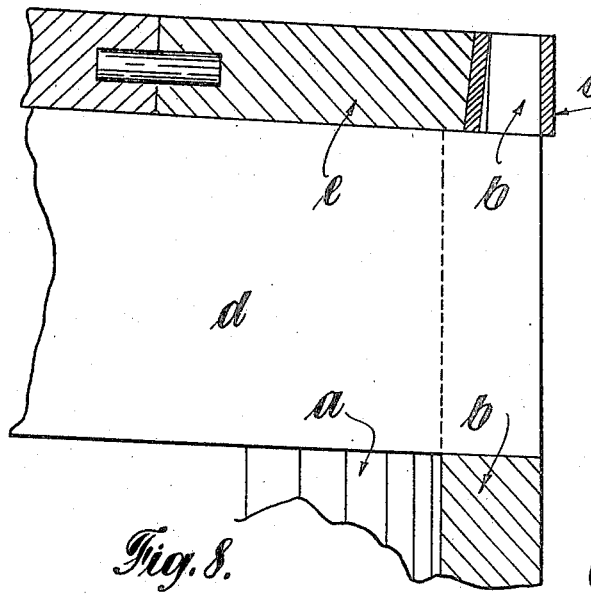

Fig. 8 illustrates a further and enlarged sectional elevation, and

Figure 9:
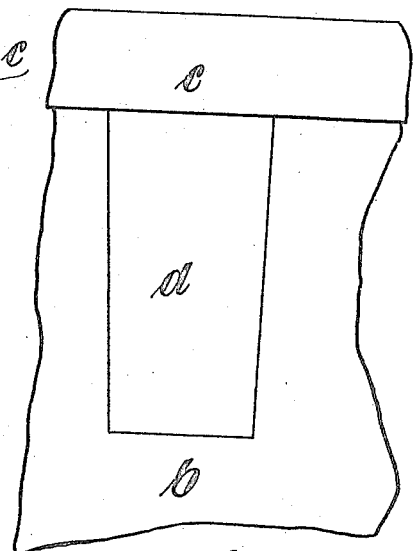

Fig. 9 an exterior side elevation of a portion of the upper part of the improved vat.

Figure 10:
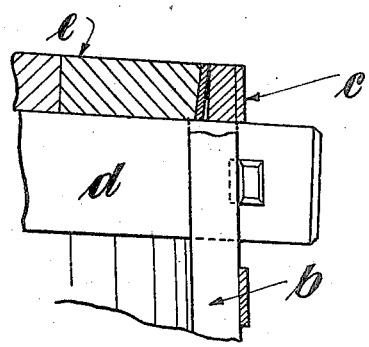
Figure 11:
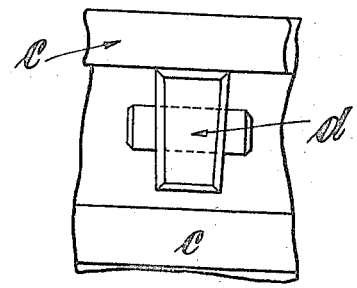

Figs. 10 and 11 illustrate like views of a modification.

Figure 12:
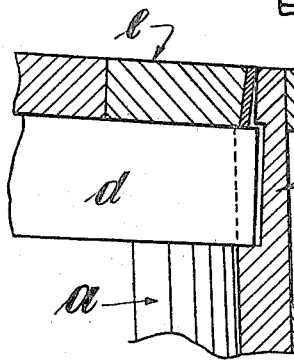

Fig. 12 illustrates a sectional elevation of a further modification.

Figure 13:
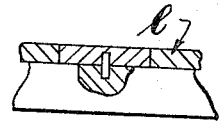
Figure 14:
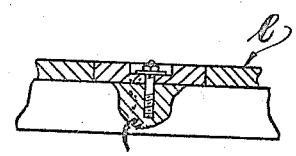

Figs. 13 and 14 illustrate details hereinafter described.

Fig. 15 illustrates a further sectional elevation, and

Fig. 16 a side exterior view of a portion of the upper part of the vat constructed according to a modification.

Figs. 17 and 18 illustrate a modification of the man-hole cover.

Figure 1:
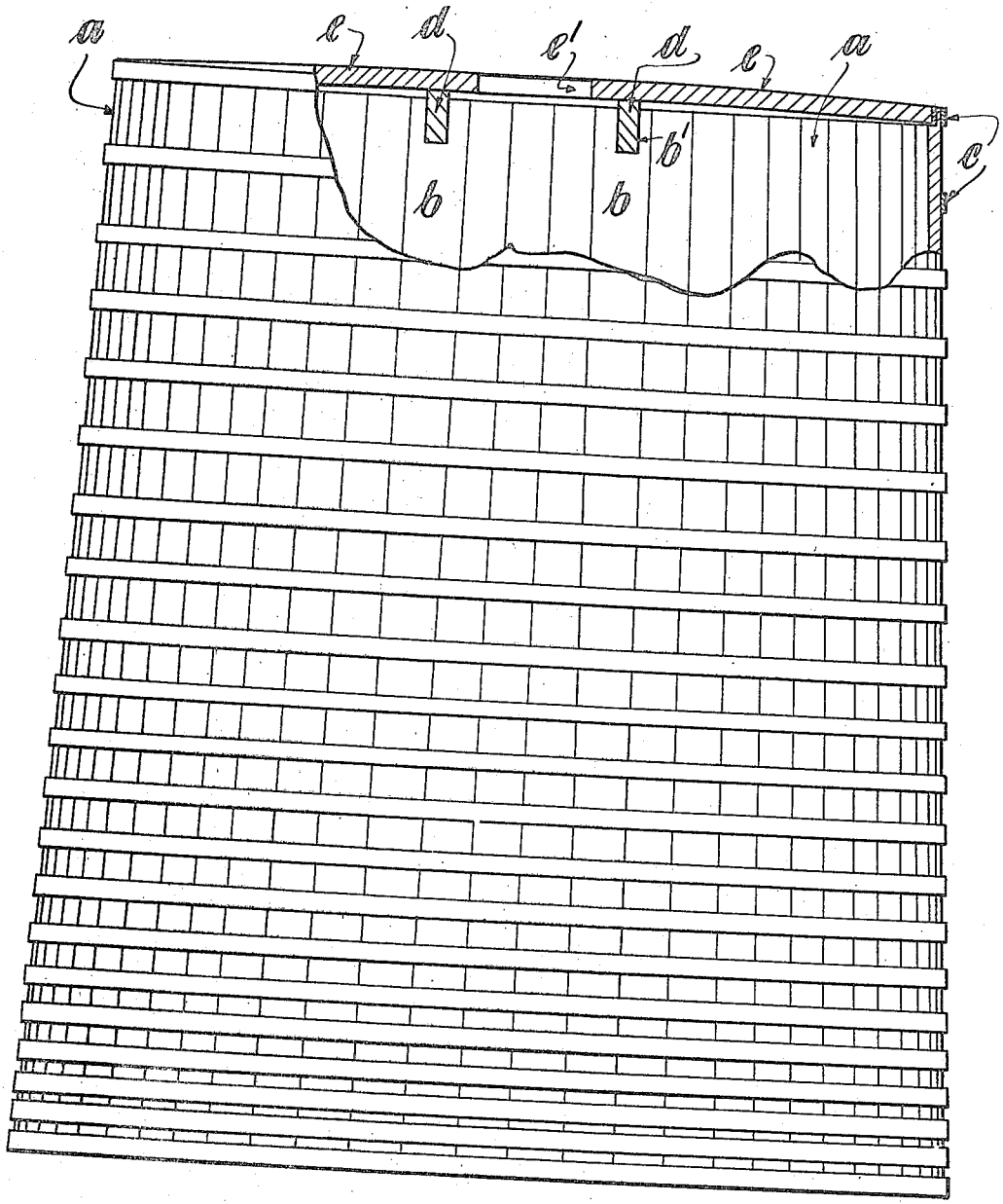
Figure 1 illustrates a part exterior and part sectional side elevation of a large wood vat embodying the invention.
Figure 2:
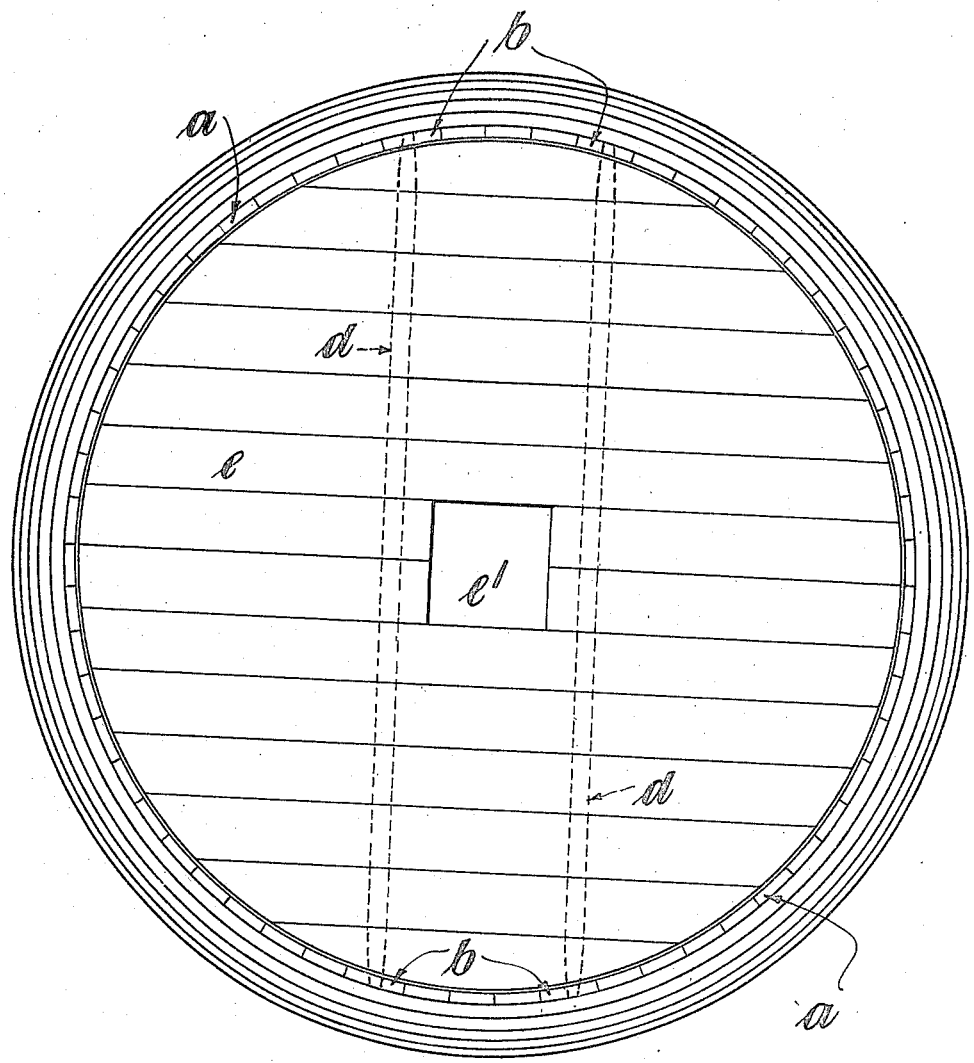
Fig. 2 illustrates a plan of the vat.
Figure 4:
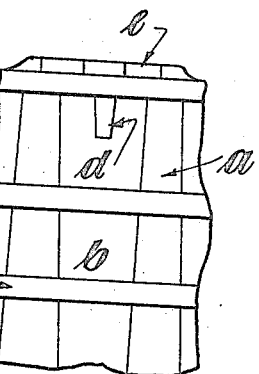
Fig. 4 illustrates a side exterior view of the same portion of the upper part of the vat.
Figure 5:
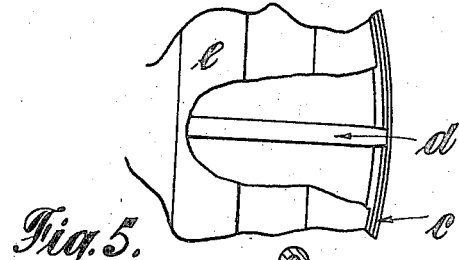
Fig. 5 illustrates a plan view of Fig. 3, partly broken away.

Referring to Figs. 1 and 2, the body part of the vat is, as usual, composed of staves $a$, formed wider at their lower ends than their upper ends, and of "key" staves $b$ formed wider at their upper ends than their lower ends. The staves are all about the same length and are held together by metal hoops $c$. In the upper and wider ends of each key stave $b$ is formed a slot $b'$, the slot being slightly tapered from top to bottom (see Fig. 4) and being also slightly tapered transversely (see Fig. 5). Into each slot fits the correspondingly tapered end of one of the reinforcing beams $d$, $d$ said beams extending across the top of the vat from side to side, and resting by their ends upon the bottom of the slots in the key staves. Upon the beams rests the head-part $e$ of the vat, which head part at its outer edge lies within a rabbet in the top edge of the vat. In said head part is the usual manhole $e'$. Instead of lying within the rabbet, the outer edge of the head part may overlie the top edge of the vat as shown in Fig. 15, in which case the top edge of the vat will be made without the rabbet, and in which case also the head part will be bolted to an angle-iron hoop $c'$ clamped to the vat by bolts and nuts, see Fig. 16.

The advantages of thus fixing the head part are that the head part does not call for nicety of fit, as is the case when requiring to lie in a rabbet, and by making the top edge of the vat solid the construction is simplified and rendered stronger. The head part is also more firmly supported at the edge and there is less liability of the head part being let down.

Figure 3:
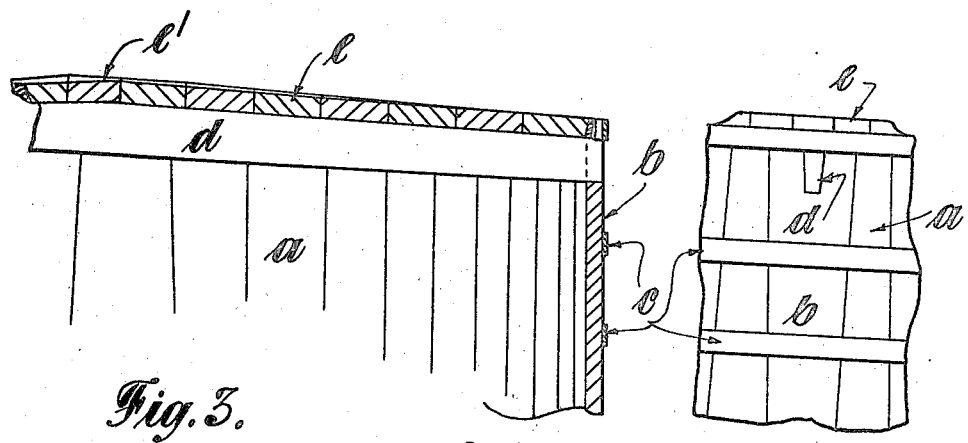
Fig. 3 illustrates a further sectional elevation of the upper portion of the vat, the section being taken at right angles to the section shown in Fig. 1.

The upper face of each beam $d$ is arched or cambered, see Fig. 3, while the head part $e$ is made convex, thereby holding the center of the head part raised above its outer edge. The head part preferably rests loosely upon the beams, no bolts being required, although, if desired, wood dowels may be used between the head part and beams, see Fig. 13, or stud bolts may be secured to the beams and pass through the holes in the head part, see Fig. 14. The nuts of the bolts will preferably lie in sinkings, as shown.

The key staves $b$ and beams $d$, $d$ are arranged at a distance apart greater than the width of the man-hole, but preferably near to the edge of the man hole in order to support as much of the central part of the head part as possible.

The ends of the beams may lie flush with the outer face of the vat, see Figs. 3 and 8, or they may extend beyond such outer face and be provided with a cotter, see Figs. 10 and 11. As a further alternative, the key staves $b$ may be formed with tapered recesses only and the beam ends rest in the recesses, see Fig. 12. The upper face of the end part of each beam is level with the bottom of the rabbet (Fig. 8) or the top edge of the vat (Fig. 15), and therefore, meets the under face of the head part, when the latter is placed in position.

It should now be seen that by arranging the beams below, instead of above the head part, and supporting the beams in slots or recesses in the key staves, the head part is relieved of the weight of the beams and the beams more effectively reinforce the head part; further the weight of the central portions of the head part is carried by the beams and such weight, acting downwardly through the beams upon the key staves, helps to tighten the staves and thus keep the vat in proper working condition. A further advantage is that by being made thicker in the center than usual and by having no bolt holes in them, the beams are much stronger than the beams heretofore used above the head part. In this connection they allow of vats of larger holding capacity and with larger head parts than usual with the old method of construction being constructed which where consistency of liquor in large quantities is desired, is a great desideratum. Alternatively, the increased strength renders the head part better adapted to support machinery for rousing or stirring the contents of the vat, or for other purposes. Another advantage is that no metal is exposed to the action of the liquor in the vat, and consequently the liquor cannot be contaminated by the metal.

The key staves $b$ will be wide enough to allow for the slotting and to preserve the strength of the stave on each side of the slot.

While showing only two beams $d$, $d$, it will be understood that there may, if desired, be more than two, with key staves for each.

Large wood tanks are usually rectangular in plan and the head part is of corresponding shape. The invention is applied thereto in like manner to vats.

Figure 6:
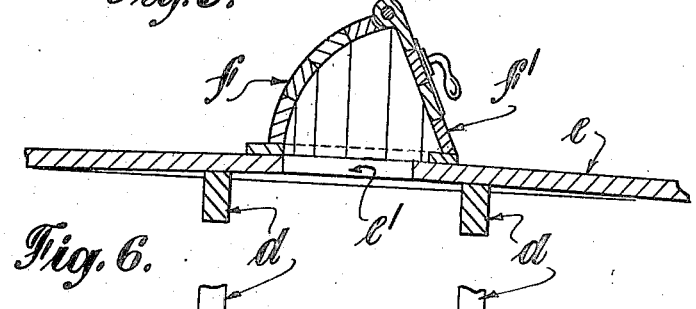
Fig. 6 illustrates a sectional elevation.

As shown in Figs. 6 and 7, the head part $e$ is fitted with a fixed quadrant cover or housing $f$ for the man-hole $e'$. Upon its open side the cover is fitted with a lid $f'$, the edge of the cover opening being sloped so that the door will close by gravity.

Instead of being a fixture, the man-hole cover may be hinged and be adapted in one position to lie within the vat, the upper side of the cover when lowered lying flat upon the head part, see Fig. 17. In another position the cover will stand above the head part, see Fig. 18. When raised the cover will be supported by the bolt $f^2$.

By arranging the beams below the head part, and by covering the man hole, it will be seen, that the attendant will be safeguarded against stumbling, and further in opening the man hole by means of the lid $f'$ he will be protected against the injurious effects of any vapors arising from the liquor in the vat or tank, the lid allowing him to open the man hole slowly, or shut it quickly as necessity arises.

The improved man-hole cover may with advantage be applied to the ordinary construction of wood vat or tank and it may also be applied wherever a man hole or trap door requires to be protected, for example, in floors, pavements, or roadways, or in roofs.

Instead of the camber of the beams being produced by arching the top faces of the beams, the beams themselves may be curved (arched) from end to end.

What we claim is:—

1. In large wood vats or tanks, and in means for preventing the center of the head part of said vats or tanks sagging, and also for affording a surface free of beams above the head part, beams arranged transversely below said head part and upon which the head part rests, the beams being arched or cambered and the ends of the beams fitting into openings in the top edge of the vat or tank body, and coacting with the sides of the vat or tank to resist downward deflection of the central part of the beams, substantially as herein set forth.

2. A large wood vat or tank, the body part of which comprises staves, certain of which are wider at the lower end than the upper end and certain others of which are wider at the upper end than the lower end, these latter being arranged in series on opposite sides of the vat or tank and each having a vertically and transversely tapered slot in its upper and wider end, beams arched or cambered upon their upper faces, and tapered vertically and longitudinally at each end, and said beams extending transversely across the top of the vat or tank and at their ends fitting the said slots, and a head part resting loosely upon the said beams, and also at its edge resting loosely upon the top edge of the vat or tank, substantially as herein set forth.

3. A large wood vat or tank, comprising a body part having tapered slots in its top edge, beams with arched or cambered upper faces extending transversely across the top of the vat or tank and at each end being tapered and resting in one of the said slots, and also projecting beyond the outer face of the vat or tank, a cotter in the projecting part of each beam and a head part resting upon the beams and upon the top edge of the vat or tank, substantially as herein set forth.

4. A large wood vat or tank, comprising a body part with solid top edge and a head part, the latter overlying the top edge of the vat or tank and held to the exterior of the vat or tank by an angle-iron hoop, beams with arched or cambered upper faces extending transversely across the top of the vat or tank and upon which the head part rests, substantially as herein set forth.

5. A large wood vat or tank, comprising a body part and a head part, the latter having a man hole, and a quadrant cover with self-closing lid for said man hole, beams with arched or cambered upper faces resting at their ends in openings in the top edge of the vat or tank, and upon which the head part rests, substantially as herein set forth.

In witness whereof we have hereunto set our hands in the presence of two witnesses.

HENRY BUCKLEY.
JOSEPH EDWARD BUCKLEY.

Witnesses:
Hy. Junca,
Fred J. Meredith.

Copies of this patent may be obtained for five cents each, by addressing the "Commissioner of Patents, Washington, D. C."